K. P. McELROY.
HYDROGENATING PROCESS AND APPARATUS.
APPLICATION FILED MAR. 28, 1912.
1,157,993.
Patented Oct. 26, 1915.
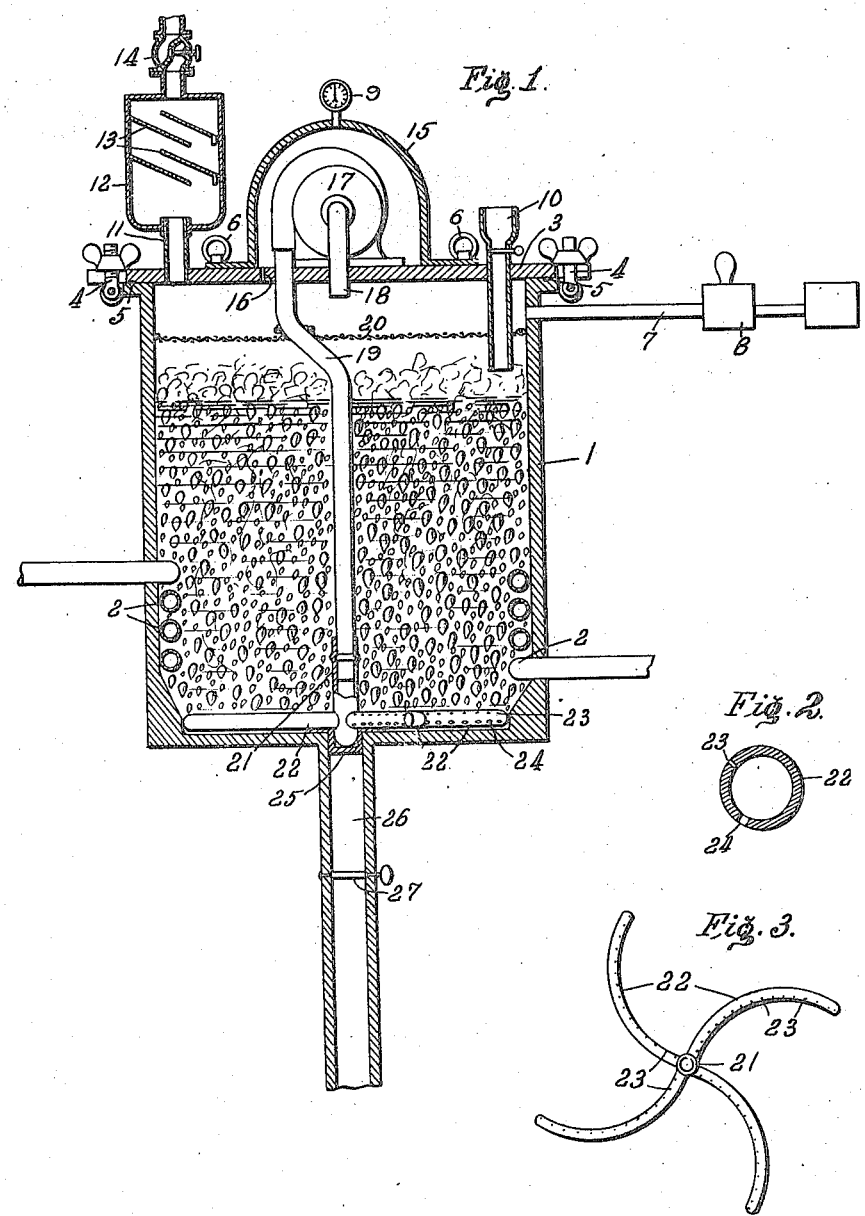

UNITED STATES PATENT OFFICE.

KARL P. McELROY, OF WASHINGTON, DISTRICT OF COLUMBIA.

HYDROGENATING PROCESS AND APPARATUS.

1,157,993.  Specification of Letters Patent.  Patented Oct. 26, 1915.

Application filed March 28, 1912. Serial No. 686,962.

*To all whom it may concern:*

Be it known that I, KARL P. MCELROY, a citizen of the United States, residing at Washington, in the District of Columbia, have invented certain new and useful Improvements in Hydrogenating Processes and Apparatus, of which the following is a specification.

This invention relates to hydrogenating processes and apparatus; and it comprises a method of treating oils, molten fats and other liquids with hydrogen in the presence of a catalytic metal, usually nickel, wherein a body or pool of liquid contained in a chamber under suitable pressure and in the presence of the catalyst, is supplied with hydrogen or hydrogen-containing gas from a suitable source and the hydrogen so supplied is caused to pass repeatedly through the liquid in cyclic circulation in such manner as to foam or emulsify said liquid; and it also comprises a combination of apparatus elements comprising a reaction chamber adapted to contain a body of liquid under suitable heat and pressure with means for supplying reaction gas thereto, means for venting waste or surplus gas and cyclic gas-circulation means connected to said chamber and adapted to withdraw gas from the top of said chamber and reintroduce it into the base of the body of liquid in fine bubbles; all as more fully hereinafter set forth and as claimed.

In the Sabatier and Senderen's synthesis, hydrogen is added to unsaturated compounds by treating the same with hydrogen in the presence of freshly reduced nickel. Other metals, such as cobalt, iron, copper, palladium, etc., may be used, but nickel is the metal of greatest applicability. The mechanism of the reaction is not exactly known but it is presumed that molecular hydrogen is taken up by the reactive metal, possibly to form a hydrid or possibly by simple adsorption, and is redelivered in atomic form; as "nascent" hydrogen. The original development of the synthesis was in the line of treating mixtures of gases or of vapors and hydrogen with the nickel; but later it was found applicable to liquids as well and of late the treatment of oleic acid or olein, and of fats and oils containing olein, linolein, etc., has become of commercial importance. Olein is converted by absorption of hydrogen in this way into the commercially more valuable stearin; commercial stearin is freed of small amounts of adhering olein; cottonseed and other oils are hardened and raised in melting point, etc. The method is also applicable to converting the high-boiling vaseline-like amorphous unsaturated hydrocarbons of petroleum oils into saturated crystallizable paraffin wax.

In "hardening" oils in this way, it is customary to make a mixture of the oil (or melted fat or grease) with the catalyst and pass a current of hydrogen through it at a high temperature; often around 200° C. Pressure is usually employed since it hastens the reaction. The hydrogen may be produced by any convenient means; as by electrolysis, by blowing steam over iron, purifying water gas by removing the CO, etc. Or water gas alone may be used. The catalyst is usually nickel reduced at a low temperature, say around 300° C., from nickel oxid. Metal from the chlorid does not work as well. Reduction may be by hydrogen, producer gas, etc. The catalyst may be used in connection with any suitable carrier such as pumice stone, kieselguhr, petroleum coke, etc.; pumice stone, for example, being impregnated with a solution of nickel nitrate, dried, heated and reduced in hydrogen. The carrier is useful in facilitating separation of the catalyst by filtration after the oil has been treated, since reduced nickel *per se* is a very finely divided material, and in reducing the specific gravity of the catalyst and in extending the surface of contact with the oil.

Taking the hardening of cottonseed oil by hydrogen and nickel as a typical example, it will be seen that there are three reacting bodies, a gas, a liquid and a solid. These three cannot well be brought into simultaneous contact since the oil will always keep the nickel surfaces covered and spaced away from the gas whatever the means for agitation adopted. As a matter of fact, the reaction goes forward by the physical solution of hydrogen in the oil, absorption from the oil by the nickel and redelivery, chemically, to the oil. With nickel at the bottom of a stationary body of oil having hydrogen above it, the bottom layers of oil next the nickel are those which undergo change while the upper layers next the gas do not change.

The hydrogen dissolves in the upper layers, diffuses downward to the nickel and is redelivered to the bottom layer of oil to effect the chemical change.

The speed of reaction in practice therefore depends on the rate of solution of hydrogen in the oil; and although hydrogen is the most rapidly diffusing gas known this rate of solution is nevertheless slow for the reason that the amount of hydrogen in contact with any given surface of oil is, in absolute weight, very small. A cubic foot of hydrogen weighs, approximately, only about a tenth of an ounce. Whatever the rate of solution therefore but a small weight of hydrogen can be taken up by a surface of oil in a minute, or other time unit. The amount of hydrogen which can be held dissolved by oil is also very little; hydrogen being only slightly soluble in oil.

In the prior art, attempts have been made to accelerate the speed of action by increasing the pressure in the reaction chamber which multiplies concomitantly the amount of hydrogen which can be held in solution by the oil and can be absorbed therefrom by the nickel; but this expedient, while useful, alone is not capable of producing a high acceleration. The oil has also been showered and distributed through the hydrogen; but this, while also useful, is not sufficient to produce as much acceleration as is commercially desirable. The drops of oil, even if saturated in transit with the hydrogen, do not, in absolute weights, take up a great deal of the gas. The expedient also has the disadvantage of giving only a limited capacity to the reaction chamber since the volume of oil must be relatively small.

In the present invention I have devised a method of operation taking advantage of the stated facts and obviating the stated disadvantages of the prior art and giving me a relatively rapid operation and high efficiency of a given apparatus. In the present invention instead of showering or filming the oil and disturbing its relation to the catalyst, I preserve the body of oil and catalyst as a body or pool and increase the absorbing surface of the oil by maintaining it as a more or less emulsion-like mass of oil and gas. To do this, I introduce the gas into the reaction chamber under whatever pressure may be desired and cyclically circulate this gas through the oil by a fan, so that the same portion of gas may circulate repeatedly. Hydrogen being very light, any individual bubble does not remain long in the liquid before rising and bursting; but I may speed up the fan at such a rate that the liquid is converted into and maintained as an emulsion-like mass of oil and gas, giving an indefinitely large surface of oil exposed to the gas for absorption of the same. This operation also of course produces active stirring and maintains the catalyst in thorough suspension. Advantageously, the catalyst is used on a relatively light or voluminous carrier, such as petroleum coke, as this aids in the suspension.

In the present invention, a reaction chamber of any suitable size or shape, is provided with heating means and with means for delivering gas thereto, as well as means for venting waste gases. In addition it is provided with means for cyclic circulation of gas to, through and beyond the body of liquid. This means may comprise a fan having an intake at the top of the chamber for receiving gas and a delivery tube extending to the bottom of the body of liquid and perforated to deliver fine streams of gas. The fan may be mounted within the casing or on it and protected by a hood or housing having communication with the interior of the chamber through a suitable conduit so that the fan may not be compelled to work against the chamber pressure.

In the accompanying illustration, I have shown such a device.

In this showing, Figure 1 is a vertical section of the apparatus; and Figs. 2 and 3 are details showing structure of the gas delivery means.

In the showing of Fig. 1, element 1 is a casing of any convenient material or shape adapted to withstand internal pressure. It is provided with heating means, shown as steam coil 2. At the top it is closed by removable cover 3 which may be secured in place by swinging bolts 4, and has gasketing means 5. Ring bolts 6 may be used to remove the cover for purposes of cleansing. Entering the casing is pipe 7 fed with gas from pump 8 under any pressure that may be desired, this pressure being indicated by gage 9. Thermometers and other accessories may be provided. Mounted on the cover is valved oil inlet 10 and gas outlet 11. This outlet is expanded into entrainment chamber 12 provided with internal baffles 13, or any suitable means of preventing entrainment. Valve 14 allows control of the escape of waste gas, which may be conducted to any suitable point of use. Mounted on the cover is a hood or housing 15 communicating with the interior of the chamber through pressure equalizing orifice or conduit 16. Within this chamber is a fan 17 withdrawing gas from the interior of the casing through 18 and redelivering it through downward stationary pipe 19. This pipe may carry a wire gauze septum 20 or any other convenient means for breaking bubbles where such is necessary. At its lower end this pipe carries a rotatable collar 21 provided with four arms 22. These arms are mounted to sweep the bottom of the casing and prevent the deposition of catalyst thereon. The gas escaping through upper orifice 23 tends to whirl the arms backward. Any liquid which may be taken up by the fan is sent downward into these arms and escapes through the larger orifice 24 near the bottom of the arm, also tending to whirl the arms. At is base, the rotatable member is seated in a stationary collar 25 which may be kept from rotating by its shape. This collar seats in and closes the top of outlet conduit 26 valved at 27.

As hydrogen escapes through an orifice with greater speed than any other gas, the upper orifice 23 should be relatively small. The lower orifice 24 which delivers liquid may be larger. The cross screen 20 serves to break the bubbles and prevent foam rising into the fan. Should however foam enter the fan it causes no material trouble and liquid which is naturally foamy tends to retain its bubbles in any event, and therefore with such liquid no great fan speed is necessary. Orifice 16 between the reaction chamber and the hood which incloses the fan equalizes the pressure around and within the fan. This is desirable since the chamber is ordinarily working under several atmospheres pressure. Stationary collar or cap 25 prevents the catalyst settling into a low place beyond the reach of the rotating arms. As will be evident, by lifting the cover through the ring bolts, all the internal elements save the steam pipes can be removed, rendering the cleaning of the apparatus easily possible. By slightly lifting the cover, collar or cap 25 is also lifted and allows the oil to escape through 26.

By introduction of the gas from the rotary arms in the manner described, several improved results are obtained. For one thing, the arms sweeping close to the bottom prevent local accumulations of settled catalyst. For another, they give the liquid as a whole a rotary motion which aids in the stirring action of the gas bubbles, and therefore also tends to prevent settling. But the most important advantage is that the whirling motion of the liquid prevents the gas bubbles rising directly, causing them to take a non-vertical, more or less curved path in their ascent to the surface and, thereby, prolonging their contact with the liquid. Hydrogen bubbles are of course very light and ascend quickly, so that any retardation of the ascent such as this motion affords is important. Of course special mechanically acting stirring means may be employed to cause the circulation of the liquid, and thereby the ascent of the bubbles in a non-vertical path with longer retention in the liquid, but the means shown whereby the energy of the fan is caused to actuate the arms is simple and convenient.

In a typical embodiment of the present invention, a desired amount of cottonseed oil, or other oil, carrying in suspension granulated petroleum coke or pumice stone impregnated with freshly reduced nickel is charged into 1 through 10 and the heat raised to the desired point. The temperature may advantageously be between 150° and 200° C. for rapid action. Hydrogen is now introduced through 7 until any desired pressure, say 5 or 6 atmospheres, is attained when fan 17 is started and cycle circulation of gas begun. Hood 15 communicating with the reaction chamber through pressure equalizing orifice 16, the fan which does not have to operate against the chamber pressure, may be of light construction. Whatever the working pressure on the gas in the chamber, the fan does not disturb it save in so far as its suction action in working against the hydrostatic pressure of the liquid is concerned. Necessarily the pressure at the entrance to 18 is somewhat less than the pressure in 19; the particular difference depending on the speed of the fan, the depth of liquid, etc. Gas from above the liquid is sent through 19 to arms 22 and emerges mainly through orifices 23, causing the arms to whirl and impart a whirling motion to the liquid. The bubbles pass upward through the liquid and if any foaming occurs on the surface the foam is mainly broken by gauze screen 20. Some entrained liquid is apt to enter the fan with the gas through 18, but this does no harm since it is directed down through 19 and escapes through 24. As inert gases accumulate in the reaction chamber they may be vented from time to time through 14. Any entrained oil is caught by baffles 13 and returned.

The treatment is continued till the desired amount of hardening is secured; i. e., until the desired amount of olein is converted into stearin.

In the showing for convenience of illustration the relative size of the bubbles has been shown as somewhat exaggerated. In practice, the bubbles are kept as fine as may be, it being an object of the present invention to maintain the liquid under treatment as practically an emulsion of finely divided gas in oil.

What I claim is:—

1. In the hydrogenation of oily substances, the process which comprises maintaining a liquid body of such a material in a closed container in the presence of a hydrogenating catalyst and under suitable heat and pressure, supplying a gas comprising hydrogen to said container and producing a cyclic circulation of such gas independent of such supply, directly from, to and through said liquid body to form bubbles therein.

2. In the hydrogenation of oily substances, the process which comprises maintaining a liquid body of such a material in a closed container in the presence of a hydrogenating catalyst and under suitable heat and pressure, supplying a gas comprising hydrogen to said container and producing a cyclic circulation of such gas independent of such supply, directly from, to and through said liquid body in the form of minute bubbles ascending in a non-vertical path.

3. In the hydrogenation of oily substances, the process which comprises maintaining a liquid body of such a substance in admixture with a hydrogenating catalyst as an emulsion of gas and liquid by a rapid cyclic circulation of gas comprising hydrogen directly from, to and through such body.

4. In the hydrogenation of oily substances, the process which comprises maintaining a liquid body of such a material in a closed container in the presence of freshly reduced nickel and under suitable heat and pressure, supplying a gas comprising hydrogen to said container and producing a cyclic circulation of such gas independent of such supply directly from, to and through said liquid body to form bubbles therein.

5. In the hydrogenation of oily substances, the process which comprises maintaining a liquid body of such a substance in admixture with freshly reduced nickel as an emulsion of gas and liquid by a rapid cyclic circulation of gas comprising hydrogen directly from, to and through such body to form bubbles therein.

6. The process of hydrogenating and hardening glycerid oils which comprises maintaining a liquid body of such an oil in admixaure with freshly reduced nickel as an emulsion of gas and liquid by a rapid cyclic circulation of gas comprising hydrogen directly from, to and through such body to form bubbles therein.

7. The process of hardening cottonseed oil which comprises maintaining a liquid body of such oil in admixture with freshly reduced nickel and at a suitable heat and pressure as an emulsion of gas and oil by a rapid cyclic circulation of gas comprising hydrogen directly from, to and through such body to form bubbles therein.

8. The process of hardening cottonseed oil which comprises maintaining a liquid body of such oil in admixture with freshly reduced nickel and at a suitable heat and pressure as an emulsion of gas and oil by a rapid cyclic circulation of gas comprising hydrogen through such body, the gas being caused to rise directly from, to and through said body as minute bubbles ascending in a non-vertical path.

9. In a hydrogenating apparatus, a casing adapted to withstand pressure, means for heating the same, means for delivering gas comprising hydrogen to the casing and means independent of such gas delivering means for cyclically circulating gas from the top of the casing to the base of said casing through the liquid as minute bubbles.

10. In a hydrogenating apparatus, a casing adapted to withstand pressure and to contain liquid, means for heating the same, means for delivering gas comprising hydrogen to the casing, a fan, a gas feed conduit from the upper portion of the casing to the fan and a gas delivery conduit extending from the fan to a point near the bottom of the casing below the normal level of the liquid.

11. In a hydrogenating apparatus, a casing adapted to withstand pressure, means for heating the same, means for delivering gas comprising hydrogen to the casing, a fan, a gas feed conduit from the upper portion of the casing to the fan, and a gas delivery conduit extending from the fan to a point near the bottom of the casing and a plurality of stirring arms revolubly mounted on the lower end of said conduit, said arms being perforated on one side to permit exit of gas.

12. The process of hardening cottonseed oil which comprises maintaining a liquid body of such oil in admixture with freshly reduced nickel and at a suitable heat and pressure as an emulsion of gas and oil by a rapid cyclic circulation of gas comprising hydrogen directly from, to and through such body, said gas being delivered by rotating means located at the bottom of said body and driven by reaction from such delivery of said gas.

13. The process of hydrogenating oily material containing unsaturated bodies which comprises repeatedly bubbling a strong current of a hydrogen-containing gas through a pool of said oily material carrying a catalyzer, in collecting the unabsorbed portion of the gas in a space above said pool and out of substantial contact with the oily material, in rapidly withdrawing the gas from said space, whereby any substantial accession of pressure in said space is prevented and in again bubbling the gas through said pool.

14. The process of hydrogenating oily material containing unsaturated bodies which comprises repeatedly bubbling a strong current of hydrogen through a pool of said oily material carrying a catalyzer and maintained under thermal conditions adapted to the absorption of hydrogen, in collecting the unabsorbed portion of the gas in a space above said pool and out of substantial contact with the oily material, in rapidly withdrawing the gas from said space; whereby any substantial accession of pressure in said space is prevented, and in again and repeatedly bubbling the gas through said pool.

15. An apparatus for treating oil with hydrogen gas which comprises a closed receptacle adapted to contain oil, a circulating pump for passing said gas in cyclic manner through said receptacle, a housing substantially surrounding said pump, and a conduit connecting said housing with said receptacle.

In testimony whereof, I affix my signature in the presence of two subscribing witnesses.

K. P. McELROY.

Witnesses:
JOHN H. SIGGERS,
H. SCHOENTHAL.